United States Patent [19]

Okada et al.

[11] Patent Number: 4,670,309

[45] Date of Patent: Jun. 2, 1987

[54] METHOD FOR PROVIDING ANTI-WEATHERING RESISTANCE TO THE SURFACE OF ORGANIC MATERIALS

[75] Inventors: Fumio Okada; Toshio Oba; Morizo Nakazato, all of Gunma, Japan

[73] Assignees: Shin-Etsu Chemical Co., Ltd.; Bridgestone Tire Co., Ltd., Japan

[21] Appl. No.: 882,018

[22] Filed: Jul. 3, 1986

Related U.S. Application Data

[63] Continuation of Ser. No. 667,533, Nov. 2, 1984, abandoned.

[30] Foreign Application Priority Data

Jul. 11, 1983 [JP] Japan ................. 58-208855

[51] Int. Cl.$^4$ ............................................. B05D 3/02
[52] U.S. Cl. ..................... 427/387; 427/389; 427/393; 427/393.5
[58] Field of Search ............ 427/387, 389, 393.5, 427/385.5, 393

[56] References Cited

U.S. PATENT DOCUMENTS

| | | | |
|---|---|---|---|
| 2,494,920 | 1/1950 | Warrick | 427/387 |
| 3,919,344 | 11/1975 | Merrill et al. | 525/477 |
| 3,983,265 | 9/1976 | Letoffe | 427/387 X |
| 4,370,365 | 1/1983 | Takamizawa et al. | 427/387 |
| 4,388,449 | 6/1983 | Bonnet et al. | 528/10 X |
| 4,395,443 | 7/1983 | Shimizu et al. | 427/387 |
| 4,418,157 | 11/1983 | Modic | 528/15 X |
| 4,490,500 | 12/1984 | Smith | 524/378 |

FOREIGN PATENT DOCUMENTS

| | | | |
|---|---|---|---|
| 2903376 | 7/1980 | Fed. Rep. of Germany | 427/387 |
| 0804162 | 11/1958 | United Kingdom | 427/387 |
| 1377383 | 12/1974 | United Kingdom | 427/387 |

*Primary Examiner*—Thurman K. Page
*Attorney, Agent, or Firm*—Toren, McGeady and Goldberg

[57] ABSTRACT

The invention provides a method for protecting the surface of various kinds of shaped articles made of an organic polymeric material such as rubbers, leathers, woods, plastics and the like against weathering caused by exposure to ultraviolet light, ozone, moisture, etc. The method comprises providing the surface with a coating layer of a specific organopolysiloxane composed of difunctional, tetrafunctional and nonfunctional siloxane units in a limited molar proportion of 50-85%, 10-30% and 5-20%, respectively.

2 Claims, No Drawings

METHOD FOR PROVIDING ANTI-WEATHERING RESISTANCE TO THE SURFACE OF ORGANIC MATERIALS

This is a continuation of application Ser. No. 667,533, filed Nov. 2, 1984 now abandoned.

BACKGROUND OF THE INVENTION the present invention relates to a method for providing protection to the surface of an organic material such as rubbers, leathers, plastics and the like against degradation by weathering caused by exposure to ultraviolet light, ozone, moisture and others.

One of the defective points of articles shaped of an organic material such as rubbers, leathers, plastics and the like is the degradation of the surface properties in time when exposed to atmospheric influences such as ultraviolet light, ozone, moisture and others. It is a conventional method, therefore, that these articles are shaped with internal addition of an antioxidant, ultraviolet absorber and the like protecting agent. The addition of such a protecting agent alone, however, is sometimes not so effective as to completely prevent the undesirable phenomena in the lapse of time such as discoloration, blooming and the like.

Accordingly, these shaped articles are also protected from outer influences by coating the surface with a coating composition. Such a method of surface coating is not always satisfactory in several respects. For example, coated surfaces may exhibit unnatural appearance and obsoleted coating films must be renewed after complete removal with great difficulties. It is also practiced that a protecting agent containing a dimethylsilicone fluid as the principal ingredient is applied to the surface to be protected. This method is also not quite satisfactory due to the insufficient effectiveness and durability of the effect. In addition, the application of a dimethylsilicone fluid may have a disadvantage of accelerating stress cracking on the surface of some substrate materials.

SUMMARY OF THE INVENTION

It is therefore an object of the present invention to provide a method for imparting anti-weathering resistance to the surface of an article shaped of an orgainc polymeric material such as rubbers, leathers, plastics and the like free from the above described problems and disadvantages in the prior art methods.

Thus, the method of the present invention for imparting anti-weathering resistance to the surface of an article comprises providing the surface with a layer of an organopolysiloxane composed of from 50 to 85% by moles of difunctional organosiloxane units represented by the general formula $R^1_2SiO$, from 10 to 30% by moles of tetrafunctional siloxane units of the formula $SiO_2$ and from 5 to 20% by moles of monofunctional organosiloxane units represented by the general formula $R^2_3SiO_{0.5}$, in which $R^1$ and $R^2$ are each a hydrogen atom or a monovalent hydrocarbon group although not all of the groups $R^1$ and $R^2$ in a molecule are hydrogen atoms.

DETAILED DESCRIPTION OF THE PREFERRED EMBODIMENTS

The above described surface-protecting agent composed of the three kinds of the siloxane units in the specified proportion is very effective in imparting the surface of the material such as rubbers, leathers, plastics and the like with strong resistance against outer influences by ultraviolet light, ozone, moisture and others with no adverse effects to the properties inherent to the material. Moreover, the application of the above described protecting agent to the surface of an already partly degraded article has an effect to interrupt further proceeding of the degradation in addition to the effect of imparting an apparently fresh appearance to the coated article.

As is described above, the effective ingredient in the surface-protecting agent used in the inventive method is an organopolysiloxane composed of the three kinds of the siloxane units represented by the formulas $R^1_2SiO$, $SiO_2$ and $R^2_3SiO_{0.5}$ in a specified proportion. The groups denoted by $R^1$ and $R^2$ are each a hydrogen atom or a substituted or unsubstituted monovalent hydrocarbon group although not all of the groups denoted by $R^1$ and $R^2$ in a molecule are hydrogen atoms. The substituted or unsubstituted monovalent hydrocarbon group is selected from the class consisting of alkyl groups such as methyl, ethyl, propyl and butyl groups, alkenyl groups such as vinyl and allyl groups, aryl groups such as phenyl and isopropenylphenyl groups and cycloalkyl groups such as cyclohexyl group as well as substituted hydrocarbon groups obtained by the substitution of halogen atoms, cyano groups and the like substituents for part or all of the hydrogen atoms in the above named hydrocarbon groups. Exemplary of such substituted monovalent hydrocarbon groups are chloromethyl, 3,3,3-trifluoropropyl, cyanomethyl, N-(2-aminoethyl)-3- aminopropyl and 3-aminopropyl groups. The groups $R^1$ and $R^2$ in a molecule may be either of the same kind or any combination of two kinds or more of the above named hydrocarbon groups without particular limitations. It is preferable, however, that at least 60% by moles of the groups denoted by $R^1$ and $R^2$ are methyl groups in view of the better effect of water repellency on the coating film formed of the surface-protecting agent than otherwise and easiness in the industrial preparation of the surface-protecting agent.

The surface-protecting agent used in the inventive method should contain each of the three kinds of the siloxane units in a molar proportion specified above. For example, the difunctional siloxane units $R^1_2SiO$ should be contained in a proportion from 50 to 85% by moles. When this proportion exceeds 85% by moles, the protecting agent may acquire a property resembling that of silicone fluids so that the desired protecting effect to the substrate surface is decreased. When this proportion is smaller than 50% by moles, on the other hand, the coating film formed of protecting agent is poor in the flexibility so that the coating film may be cracked or fall off during use of the coated article and the protecting effect is rapidly lost. The molar proportion of the tetrafunctional siloxane units $SiO_2$ should be in the range from 10 to 30% because difficulties are encountered in the preparation of an organopolysiloxane of which the molar proportion of the units $SiO_2$ exceeds 30% while an organopolysiloxane containing smaller than 10% by moles of this type of the siloxane units may exhibit decreased protecting effects. The molar proportion of the monofunctional siloxane units $R^2_3SiO_{0.5}$ should be in the range from 5 to 20% since the molecular weight of an organopolysiloxane containing 20% by moles or more of the monofunctional units cannot be large enough to be capable of exhibiting the desired protecting effect with durability while difficulties are encountered in the preparation of an organopolysiloxane containing less than 5% be moles of the monofunctional units.

The organopolysiloxane composed of the above described three types of the siloxane unites can readily be prepared by the cohydrolysis of a mixture of hydrolyzable halogeno- or alkoxysilane compounds such as $R^1{}_2SiCl_2$ and $R^1{}_2Si(OCH_3)_2$ as the examples of the difunctional silane compounds, $SiCl_4$ and $Si(OC_2H_5)_4$ as the examples of the tetrafunctional silane compounds and $R^2{}_3SiCl$ and $R^2{}_3SiOCH_3$ as the examples of the monofunctional silane compounds followed by dehydration condensation of the cohydrolysis product in an organic solution. It is preferable that the organopolysiloxane thus obtained is further subjected to the so-called equilibration or polymerization reaction at a temperature of 100° of 180° C. in the presence of an alkali catalyst so that the molecular weight of the organopolysiloxane is further increased and uniformized resulting in the improvement of the effect as the surface-protecting agent.

Alternatively, the organopolysiloxane can be prepared by the so-called siloxane rearrangement, i.e. scission and recombination of the siloxane linkages, taking place in a mixture composed of, for example, 80 to 60 parts by weight of a diorganopolysiloxane fluid terminated at both molecular chain ends each with a triorganosilyl group or a silanol group and, for example, 20 to 40 parts by weight of an organopolysiloxane resin containing from 0.4 to 1.2 moles of the monofunctional organosiloxane units $R^2{}_3SiO_{0.5}$ per mole of the tetrafunctional siloxane units $SiO_2$ in the presence of an alkali catalyst into equilibration. Suitable alkali catalysts are exemplified by potassium hydroxide, sodium hydroxide, potassium siliconate and the like although acidic catalysts such as sulfuric acid, trifluoromethane sulfonic acid and the like may have a similar catalytic effect to the alkali catalysts. The above mentioned equilibration or rearrangement reaction is performed preferably in an organic solution in order to facilitate control of the reaction temperature. Suitable organic solvents include, for example, toluene, xylene, technical-grade gasoline, mineral spirit, kerosene and the like. The temperature of the reaction should usually be in the range from 100° to 180° C. or, preferably, from 110° to 150° C. since the velocity of the equilibration reaction is undesirably low at a temperature lower than 100° C.

The organopolysiloxane obtained in the above described manner can be used as such as the surface-protecting agent in the inventive method but it is more convenient in most cases that the organopolysiloxane is diluted by dissolving in an organic solvent or by emulsifying in an aqueous medium. Suitable organic solvents for the preparation of a solution-type surface-protecting agent include technical-grade gasoline, mineral spirit, kerosene, toluene, benzene and the like. The emulsifying agent used in the preparation of an aqueous emulsion-type surface-protecting agent may be any one of anionic, cationic and nonionic surface active agents exemplified by long-chain alkylsulfates, alkyl phosphates, sodium polyoxyethylene alkyl phenyl ether sulfates and the like as the examples of the anionic ones, benzylammonium salts and the like as the examples of the cationic ones and polyoxyethylene alkyl phenyl ethers, polyoxyethlene alkyl ethers, sorbitan monoesters and the like as the examples of the nonionic ones. The amount of the emulsifying agent is usually in the range from 0.1 to 20% by weight based on the organopolysiloxane.

It is of course optional that the surface-protecting composition used in the inventive method is admixed with various kinds of additives such as silicone fluids, mineral oils, natural or synthetic waxes, fatty acids and metal salts thereof, coloring agents, perfumes, antioxidants, ultraviolet absorbers and the like according to need when enlargement of the application fields and increases of the effect are desired. In practicing the method of the present invention, the surface-protecting agent may be used in the form of a non-solvent composition, organic solution, aqueous emulsion or aerosol-type spray according to desire.

The surface protecting agent is applied to the surface of various kinds of shaped articles made of, in particular, natural or synthetic rubbers, vinylic and acrylic plastics and woods as well as coated surfaces by a suitable coating means such as spray coating, brushing, dipping and the like. The coating film formed of the surface-protecting agent is repellent to water and stain and serves as a barrier against ozone, ultraviolet light, oxygen, nitrogen oxides and the like atmospheric influences so that the articles treated according to the method of the invention can maintain their beautiful appearance lastingly and be protected from degradation advantageously.

In the following, examples are given to illustrate the method of the invention in more detail. In the examples, the expression of "parts" in each occurrence refers to "parts by weight" and all of the values of viscosity are those obtained by the measurement at 25° C. The properties of the coating films in the examples were obtained according to the following testing procedures.

(1) Water repellency

A small volume of water was sprinkled over the coated surface and the condition of the water droplets was visually examined to give the results in three ratings of Good, Fair and Poor according to the following criteria.

Good: the water was well repelled in tiny droplets.
Fair: the surface exhibited water-repellency but the droplets were relatively large.
Poor: the water-repellency was poor and the surface was at least partly wet with water.

(2) Durability of water-repellency

The coated surface was forcibily rubbed with a brush wet with a 2% aqueous solution of a neutral detergent followed by rinse with water and this cycle was repeated to examine the water-repellency after every five cycles.

(3) Surface gloss

The gloss of the coated surface was visually examined and the results were expressed in two ratings of Good and Poor according to the following criteria.

Good: the surface gloss was good to be close to that of a newly shaped article.
Poor: the surface gloss was apparently inferior.

(4) Anti-ultraviolet resistance

The coating film formed on a natural rubber sheet of 2 mm thickness was stretched by 20% together with the rubber sheet and exposed outdoors as such for 30 days in summer weather and the condition of surface cracks in the rubber sheet was examined by use of a loupe of 10 magnifications to give the results in five ratings of A to E according to the following criteria.

A: no change was noted at all in the surface condition.

B: very small cracks were found but the density thereof was less than 3 per cm².
C: very small cracks were found and the density thereof was 3 to 10 per cm².
D: large cracks were found but the density thereof was less than 3 per cm²,
E: large and small cracks were found and the density thereof was more than 10 per cm².

(5) Anti-ozone resistance

The coating film formed on a natural rubber sheet of 2 mm thickness was stretched by 20% together with the rubber sheet and exposed as such from 96 hours to an atmosphere at 40° C. containing 50 pphm (pars per hundred millions) of ozone followed by the visual examination of crack formation on the surface of the rubber sheet to give the results in five ratings of A to E by the same criteria as in the test of the anti-ultraviolet resistance.

EXAMPLE 1

Into a reaction medium composed of 200 parts of xylene, 20 parts of isoprophyl alcohol and 300 parts of water in a reaction vessel equipped with a stirrer, thermometer and cooler was added dropwise a mixture composed of 62.1 parts of a dimethylpolysiloxane having a degree of polymerization of 50 and terminated at both molecular chain ends each with a chlorine atom directly bonded to the terminal silicon atom, 26.4 parts of orthoethyl silicate and 11.4 parts of trimethyl chlorosilane under agitation at 30° to 50° C. and agitation was further continued for 3 hours keeping the temperature of the reaction mixture at 50° C. followed by the separation of the aqueous layer containing the hydrogen chloride formed by the hydrolysis and washing of the organic solution four times with water. After dehydration by use of anhydrous sodium sulfate, the organic solution was admixed with 0.15 part of a 10% methyl alcohol solution of potassium hydroxide and heated at 130° C. for 10 hours to effect the equilibration reaction followed by neutralization of the potassium hydroxide with acetic acid. After filtration, the organic solution was diluted with xylene to give a solution containing 5% by weight of the organopolysiloxane usable as a surface-protecting agent. The organopolysiloxane was composed of 78% by moles of the difunctional $(CH_3)_2SiO$ units, 12% by moles of the tetrafunction al $SiO_2$ units and 10% by moles of the monofunctional $(CH_3)_3SiO_{0.5}$ units. The properties of the organopolysiloxane as a coating film were as shown in Table 1 given below.

EXAMPLE 2

Into a reaction vessel equipped with a stirrer, thermometer, cooler and a device for the removal of the condensed distillate were introduced 100 parts of a dimethylsilicone fluid having a viscosity of 1000 centistokes and terminated at both molecular chain ends each with a trimethylsilyl group, 70 parts of a 50% by weight xylene solution of an organopolysiloxane composed of tetrafunctional $SiO_2$ units and monofunctional $(CH_3)_3SiO_{0.5}$ units in a molar ratio of 1:0.75, 100 parts of xylene and 0.15 part of a 10% methyl alcohol solution of potassium hydroxide and the mixture was heated at 140° C. for 10 hours to effect the equilibration reaction while the water distilled out of the reaction mixture and condensed was continuously discharged. After completion of the reaction, the potassium hydroxide in the mixture was neutralized with acetic acid and xylene was removed by distillation under reduced pressure to give 130 parts of a clear, colorless organopolysiloxane having a viscosity of 1500 centipoise. This organopolysiloxane was composed of 73% by moles of the difunctional $(CH_3)_2SiO$ units, 15.3% by moles of the tetrafunctional $SiO_2$ units and 11.6% by moles of the monofunctional $(CH_3)_3SiO_{0.5}$ units. A surface-protecting agent containing 5% by weight of the organopolysiloxane was prepared by diluting it with mineral spirit. The properties of the coating film formed of this surface-protecting agent were as shown in Table 1.

EXAMPLE 3

An aqueous emulsion of o/w type was prepared by emulsifying 35 parts of the organopolysiloxane prepared in Example 2 in 68 parts of water with admixture of 3 parts of (polyoxyethylene)$_{10}$ nonyl phenyl ether as an emulsifying agent. This aqueous emulsion was stable without phase separation or formation of oil spots even after three months of standing. Table 1 includes the properties of the coating film formed of the surface-protecting agent prepared by 7 times dilution of the above obtained aqueous emulsion with water.

EXAMPLE 4

An organopolysiloxane composed of 69% by moles of the difunctional siloxane units, 14.4% by moles of the tetrafunctional $SiO_2$ units and 16.6% by moles of the monofunctional $(CH_3)_3SiO_{0.5}$ units was prepared in substantially the same manner as in Example 2 from 70 parts of a diorganopolysiloxane expressed by the formula

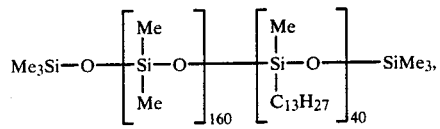

in which Me is a methyl group, and 30 parts of an organopolysiloxane composed of the tetrafunctional $SiO_2$ units and the monofunctional $(CH_3)_3SiO_{0.5}$ units in a molar ration of 1:1.5. The organopolysiloxane was a clear liquid with fluorescent appearance and had a viscosity of about 3000 centipoise.

The thus prepared organopolysiloxane was dissolved in technical-grade gasoline in a concentration of 5% by weight as used as a surface-protecting agent, of which the properties of the coating film were as shown in Table 1 below.

EXAMPLE 5

An organopolysiloxane composed of 58.7% by moles of the difunctional $(CH_3)_2SiO$ units, 26.1% by moles of the tetrafunctional $SiO_2$ units and 15.2% by moles of the monofunctional $(CH_3)_3SiO_{0.5}$ units was prepared in substantially the same manner as in Example 2 from 60 parts of a dimethylpolysiloxane terminated at both molecular chain ends each with a silanolic hydroxy group and having a viscosity of 1500 centistokes and 40 parts of an organopolysiloxane composed of the tetrafunctional units and the monofunctional units in a molar ration of 1:0.6. The organopolysiloxane thus prepared had a high viscosity and was not freely flowable at room temperature. It was dissolved in mineral spirit in a concentration of 5% by weight and used as a surface-protecting agent, of which the properties of the coating film were as shown in Table 1 below.

TABLE 1

| Surface-protecting agent | Water-repellency | Durability of water-repellency | Surface gloss | Anti-ultraviolet resistance | Anti-ozone resistance |
|---|---|---|---|---|---|
| Example 1 | Good | Fair | Good | B | B |
| Example 2 | Good | Good | Good | A | A |
| Example 3 | Fair | Fair | Good | A | B |
| Example 4 | Good | Good | Good | A | A |
| Example 5 | Good | Fair | Good | B | A |
| Comparative Example 1 | Fair | Poor | Good | D | D |
| Comparative Example 2 | Good | Fair | Good | C | D |
| None* | Poor | Poor | Poor | E | E |

*Natural rubber sheet as such

COMPARATIVE EXAMPLE 1

A 5% by weight solution of a dimethylpolysiloxane terminated at both molecular chain ends each with a trimethylsilyl group and having a viscosity of 1000 centistokes in mineral spirit was used as a surface-protecting agent, of which the properties of the coating film were as shown in Table 1 above.

COMPARATIVE EXAMPLE 2

The surface-protecting agent used in this case was a mere mixture of 100 parts of the same dimethylpolysiloxane used in Comparative Example 1 above and 70 parts of a 50% by weight xylene solution of the same organopolysiloxane composed of the tetrafunctional $SiO_2$ units and the monofunctional $(CH_3)_3SiO_{0.5}$ units as used in Example 2 dissolved as such in mineral spirit in a concentration of 5% by weight calculated for the overall content of the organopolysiloxanes without performing the equilibration reaction. The properties of the coating film formed of this surface-protecting agent were as shown in Table 1 above.

What is claimed is:

1. A method for protecting the surface of a shaped article of a polymeric material which comprises providing the surface with a coating layer of an organopolysiloxane composed of from 50 to 85% by moles of difunctional organosiloxane units represented by the general formula $R^1_2SiO$, from 10 to 30% by moles of tetrafunctional siloxane units expressed by the formula $SiO_2$ and from 5 to 20% by moles of monofunctional organosiloxane units represented by the general formula $R^2_3SiO_{0.5}$, in which $R^1$ and $R^2$ are each independently a hydrogen atom or a monovalent hydrocarbon group, not all of the groups denoted by $R^1$ and $R^2$ being hydrogen atoms.

2. The method as claimed in claim 1 wherein at least 60% by moles of the groups denoted by $R^1$ and $R^2$ are methyl groups.